(12) United States Patent
Truta

(10) Patent No.: US 10,545,758 B2
(45) Date of Patent: Jan. 28, 2020

(54) PARALLEL PROCESSING OF HASH FUNCTIONS

(71) Applicant: TSX INC., Toronto (CA)

(72) Inventor: Cosmin Truta, Waterloo (CA)

(73) Assignee: TSX INC., Toronto (CA)

( * ) Notice: Subject to any disclaimer, the term of this patent is extended or adjusted under 35 U.S.C. 154(b) by 394 days.

(21) Appl. No.: 15/314,009

(22) PCT Filed: May 27, 2014

(86) PCT No.: PCT/CA2014/000461
§ 371 (c)(1),
(2) Date: Nov. 25, 2016

(87) PCT Pub. No.: WO2015/179942
PCT Pub. Date: Dec. 3, 2015

(65) Prior Publication Data
US 2017/0102946 A1    Apr. 13, 2017

(51) Int. Cl.
*G06F 9/38* (2018.01)
*G06F 9/30* (2018.01)
*G09C 1/00* (2006.01)
*H04L 9/06* (2006.01)

(52) U.S. Cl.
CPC ........ *G06F 9/30029* (2013.01); *G06F 9/3887* (2013.01); *G09C 1/00* (2013.01); *H04L 9/0643* (2013.01); *H04L 2209/125* (2013.01)

(58) Field of Classification Search
CPC .................................................. G06F 9/30036
See application file for complete search history.

(56) References Cited

U.S. PATENT DOCUMENTS

| 7,145,911 | B2 | 12/2006 | Gooch | |
| 8,108,682 | B2* | 1/2012 | Watanabe | H04L 9/0643 380/28 |
| 8,627,097 | B2 | 1/2014 | Wolf | |
| 9,838,291 | B2* | 12/2017 | Bukin | H04L 43/12 |
| 2005/0198473 | A1* | 9/2005 | Ford | G06F 7/76 712/221 |
| 2007/0242829 | A1* | 10/2007 | Pedlow, Jr. | H04N 7/162 380/277 |

(Continued)

OTHER PUBLICATIONS

Glenn Fowler, Landon Curt Noll, Kiem-Phong Vo, Donald Eastlake. "The FNV Non-Cryptographic Hash Algorithm" Internet Engineering Task Force (IETF) (Year: 2012).*

(Continued)

*Primary Examiner* — Jacob Petranek
(74) *Attorney, Agent, or Firm* — Perry + Currier Inc.

(57) ABSTRACT

Input data can be split into data components that can each have a length equal to a machine word size of a processor capable of parallel processing. Hash components can be selected to have a length equal to the length of the data components. A bitwise hashing function can be performed, in which each data component is hashed with a respective different one of the hash components. A representation of the hash components can be output as the hash. The bitwise hashing function can include an exclusive-or operation and a multiplication and can be a modified Fowler-Noll-Vo hashing function, such as a modified FNV-1a function.

14 Claims, 4 Drawing Sheets

(56) References Cited

U.S. PATENT DOCUMENTS

| | | | |
|---|---|---|---|
| 2008/0005052 A1* | 1/2008 | Ali | G06Q 10/00 706/45 |
| 2009/0310775 A1* | 12/2009 | Gueron | H04L 9/0637 380/28 |
| 2010/0215280 A1 | 8/2010 | Abdo et al. | |
| 2014/0095891 A1* | 4/2014 | Wolrich | H04L 9/0643 713/190 |
| 2015/0341329 A1* | 11/2015 | Mosko | H04L 63/08 726/3 |

OTHER PUBLICATIONS

Written Opinion of the International Searching Authority dated Nov. 29, 2016 for PCT International Patent Application No. PCT/2014/000461.

International Search Report dated Feb. 10. 2016 for PCT International Patent Application No. PCT/2-14/000461.

International Preliminary Report on Patententability dated Nov. 29, 2016 for PCT International Patent Application No. PCT/CA2014/000461.

* cited by examiner

| Method | Large buffer, aligned | | Large buffer, unaligned | | Small buffer |
|---|---|---|---|---|---|
| | Bytes/cycle | MiBytes/sec | Bytes/cycle | MiBytes/sec | Cycles/hash |
| FNV-1a-32<br>G. Fowler, L. C. Noll, P. Vo and D. Eastlake. Internet Draft | 0.250 | 715 | 0.250 | 715 | 51.99 |
| CRC-32<br>W. W. Peterson, D. T. Brown. Cyclic Codes for Error Detection | 0.133 | 381 | 0.133 | 381 | 91.66 |
| Lookup3<br>B. Jenkins. Lookup3 source code, public domain. | 0.491 | 1403 | 0.486 | 1389 | 51.11 |
| SuperFastHash<br>P. Hsieh. Hash functions | 0.575 | 1644 | 0.570 | 1630 | 45.43 |
| City-64<br>Google, Inc. CityHash | 0.577 | 1652 | 0.575 | 1646 | 52.96 |
| City-128<br>Google, Inc. CityHash | 0.587 | 1678 | 0.581 | 1661 | 86.83 |
| Spooky-64<br>B. Jenkins. SpookyHash: a 128-bit noncryptographic hash | 2.797 | 8003 | 2.759 | 7894 | 76.04 |
| Spooky-128<br>B. Jenkins. SpookyHash: a 128-bit noncryptographic hash | 2.794 | 7995 | 2.765 | 7911 | 79.26 |
| MurmurHash3-128<br>A. Appleby. MurmurHash3 | 1.956 | 5596 | 1.873 | 5358 | 41.19 |
| 256-bit implementation of present hash 100 | 4.738 | 13556 | 4.463 | 12770 | 47.00 |

FIG. 5

PARALLEL PROCESSING OF HASH FUNCTIONS

FIELD

The present invention relates to computers, more specifically, to computers and methods for performing hash computations.

BACKGROUND

Hash functions of a wide variety of types find numerous uses in the computer arts. Hash functions are often used to ensure data integrity during storage, transmission, or retrieval operations. However, such uses tend to be for overhead or insurance purposes and accordingly can reduce overall processing efficiency. Work has been done to reduce the processing cost of hash calculations, yet known techniques continue to fall short, particularly in low-latency applications with high volumes of data.

SUMMARY

According to one aspect of the present invention, a method of computing a hash includes initializing the hash to an initial value, receiving input data, splitting the input data into data components, performing an exclusive-or operation on each data component and a respective hash component of the hash, and multiplying each respective hash component by a pre-defined constant. The method further includes outputting a representation of the hash components as the hash.

According to another aspect of the present invention, a method of computing a hash includes splitting input data into data components, each data component having a length equal to a machine word size of an execution unit of a processor, where the machine word size is greater than one byte. The method further includes providing hash components of length equal to the length of each data component and parallel performing a bitwise hashing function, in which each data component is hashed with a respective different one of the hash components. The method further includes outputting a representation of the hash components as the hash.

According to another aspect of the present invention, a computer includes memory configured to store input data and a processor having a plurality of parallel execution units, each execution unit having a machine word size. The processor is configured to split the input data into data components, each data component having a length equal to the machine word size. The processor is further configured to provide hash components of length equal to the length of each data component and to perform a bitwise hashing function, in which each data component is hashed with a respective different one of the hash components. The processor is further configured to output a representation of the hash components as the hash.

BRIEF DESCRIPTION OF THE DRAWINGS

The drawings illustrate, by way of example only, embodiments of the present invention.

FIG. 5 is a table of test results.

DETAILED DESCRIPTION

The present invention is directed to providing computers and methods for performing hash computations, which may be found to be suitable for low-latency applications such systems designed for data replication via remote peer-to-peer communication, among other uses. Computational parallelism is used to split a hash computation into several parallel computations, which has in the past been found to be difficult or not always possible due to the iterative and byte-wise nature of many known hashing algorithms. Hence, the hashing techniques discussed herein may be found to be fast-executing while providing suitably high collision avoidance for many applications.

The present invention uses a modified Fowler-Noll-Vo (FNV) hashing function, such as a modified FNV-1a hashing function, as an example. Other hashing functions may also be adapted to be used with the presently disclosed techniques, and FNV is not to be taken as limiting. As will be seen from the below description, the present invention can retain collision avoidance characteristics comparable to FNV-1a, but with increased speeds of execution.

Figure 1:
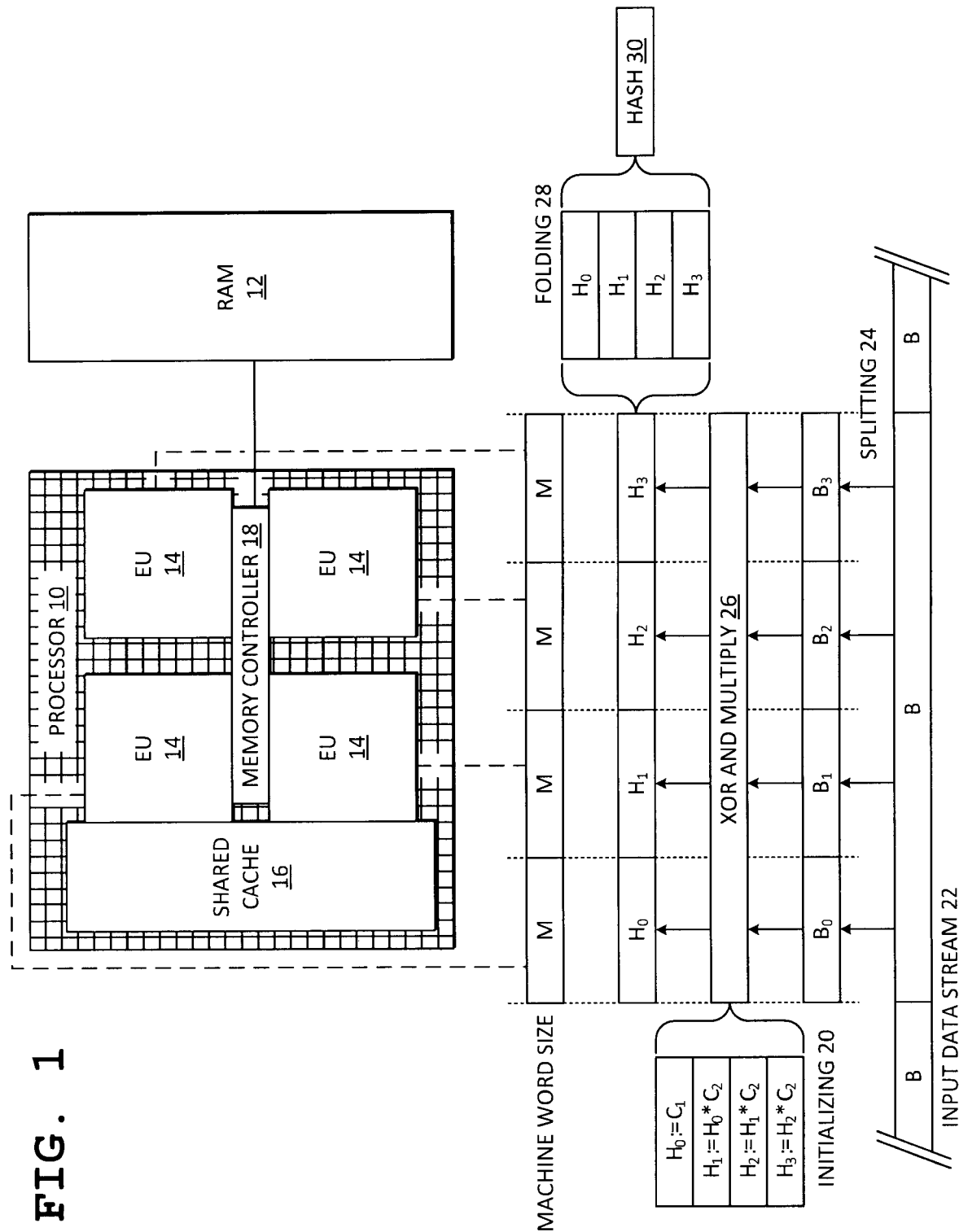
FIG. 1 is a schematic diagram of a processor and method for computing a hash.

With reference to FIG. 1, a computer for performing a hash computation includes a processor 10 and memory 12.

The memory 12 includes random-access memory (RAM), or other suitable type of memory, capable of storing instructions and data for execution and manipulation by the processor 10. The memory 12 is illustrated as off-chip, however it is contemplated that suitable memory 12 can be provided on the same piece of silicon as the processor 10.

The processor 10 includes a plurality of parallel execution units 14. Each execution unit (EU) 14 is capable of performing operations independent from the other execution units 14. The execution units 14 may be referred to as cores and the processor 14 may be referred to as a multi-core processor. Each execution unit 14 may have dedicated cache (e.g., level 1 and/or level 2 caches) for storing frequently used instructions and data. In the example illustrated, the processor 14 has four execution units 14 for sake of explanation, and more or fewer execution units are contemplated for other examples.

The processor 10 may further include shared cache 16 (e.g., level 3 cache) accessible to all execution units 14 for storing frequently used instructions and data, a memory controller 18 for interfacing with the memory 12, and other components that are not shown for sake of clarity. It should be noted that random-access memory 12, shared cache 16, and dedicated caches internal to the execution units 14 are all examples of memory capable of storing instructions and data.

The multi-core processor 10 is but one example of parallel processing architecture and should not be taken as limiting. Other architectures for parallel processing, such as superscalar processors, single instruction multiple data (SIMD) machines, multiprocessing systems, and distributed systems, are contemplated as being suitable for the hashing techniques discussed herein.

The processor 10 operates on a particular machine word size M. In this example, each execution unit 14 uses the same machine word size M. Examples of machine word sizes M include 32 bits and 64 bits.

A hash is configured to have a length in bits that is equal to the machine word size M multiplied by a number N of integer operations that can be executed in parallel without significant performance degradation. In the example multi-core processor 10, for sake of explanation, the number N is taken as the number of execution units 14, namely, four. The number N need not be the same as the number of execution units in a multi-core processor. In another example, the number N is selected to be smaller than the number of execution units available, and may be selected to be equal to the number of execution units expected to process hash calculations. The number N may alternatively be pre-defined by pinning one or more hash computing threads or processes to the same number of execution units 14. In an example SIMD machine, the number N is taken to be the length of the SIMD register divided by the machine word size M. Regardless of specific parallel processing architecture, the number N is taken to be greater than 1.

The hash H is thus represented as a tuple of N machine words of length M:

$H=(H_0, H_1, \ldots, H_{N-1})$

In the example illustrated in FIG. 1, the hash H is represented by hash components $H_0$, $H_1$, $H_2$, and $H_3$. When four execution units 14 are available (i.e., N=4) and each has a 64-bit machine word size (i.e., M=64), the hash size can be taken as 256 bits (i.e., 4*64).

The processor 10 is configured to initialize 20 the hash to an initial value. Each component of the hash can be initialized with a different pseudo-arbitrary salt value. This can advantageously reduce the effectiveness of attacks that swap machine words in an input stream. Initializing the hash can be performed in an iterative manner, in which the first component of the hash is set to a first value and each subsequent component is set to a value based on the immediately previous component. Other initialization/salting schemes can be used as well. The following pseudo-code is illustrative:

```
H_0 := C_1
for each k = 1 ... N-1:
    H_k := H_{k-1} * C_2
end for
```

The multiplication of the hash component $H_{k-1}$ and constant $C_2$ can be performed modulo $2^n$, where n is the bit length of the hash component, and higher-order bits of the products can be discarded to keep the hash components to the machine word size M. When FNV-1a is used, the value of $C_1$ can be selected to be the FNV parameter offset_basis and the value of $C_2$ can be selected to be the FNV parameter FNV_prime, both of which parameters are widely known. Values of FNV parameters can be obtained at http://www.isthe.com/chongo/tech/comp/fnv/index.html, among other resources.

The processor 10 is configured to receive a stream of input data 22 to undergo hashing, and is further configured to split the input data stream 22 into data blocks B. Each block B is selected to have the same length as the hash (e.g., 256 bits). When a data block B is not completely filled, it can be padded with zeroes or other dummy data. The processor 10 further splits 24 each block into the same number and size of components as done with the hash. Thus, a block B is represented as a tuple of N machine words of length M:

$B=(B_0, B_1, \ldots, B_{N-1})$

In the example illustrated in FIG. 1, the block B is represented by data components $B_0$, $B_1$, $B_2$, and $B_3$. Keeping with the numerical example above, each of the four data components can be 64 bits in length providing for 256 bits of total data block size.

The processor 10 is configured to then update each hash component using the respective data component of a block. In the case of FNV-1a, the processor 10 performs, at 26, a bitwise exclusive-or operation on each data component ($B_0$, $B_1$, ..., $B_{N-1}$) and the respective like-indexed hash component ($H_0$, $H_1$, ... $H_{N-1}$) and multiplies the result by a pre-defined constant $C_2$. The following pseudo-code is illustrative:

```
for each input data block B:
    for each k = 0 ... N-1:
        H_k := H_k xor B_k
        H_k := H_k * C_2
    end for
end for
```

The multiplication of the hash component $H_k$ and constant $C_2$ can be performed modulo $2^n$, where n is the bit length of the hash component, and higher-order bits of the products can be discarded to keep the hash components to the machine word size M. Further, as mentioned, when FNV-1a is used, the value of $C_2$ can be selected to be the FNV parameter FNV_prime.

As can be seen from the above, calculating the hash is performed in units of machine word size M, rather than in the byte-by-byte or bytewise manner that is specified in FNV-1a. Further, it is contemplated that the machine word size M is greater than one byte, and thus each data component can be longer than one byte and each hash component can be longer than one byte. Hence, the exclusive-or operation and the multiplying can be performed in a non-bytewise manner, that is, on components that are larger than one byte.

Performing the computation of the hash components in this manner uses parallel computing capabilities of the processor 10 to increase the speed of computation of the hash. For each data block, updates to the hash components are performed in parallel by the independent execution units 14.

The computed hash components can be folded together, at 28, to arrive at a final hash value. This can be performed if it is required to have a hash that is narrower than the combined size of the hash components. An exclusive-or operation can be used to fold at least two hash components together. The following pseudo-code is illustrative:

Hash:=$H_0$ xor $H_1$ xor . . . xor $H_{N-1}$

A representation of the hash components is output at 30. Such a representation can include two or more of the hash components themselves, two or more of the hash components strung together into a single hash, two or more of the hash components folded together, or similar.

To perform the above for a plurality of blocks B of the input data stream 22, a plurality of different hashes can be initialized, at 20, one hash H for each block B. Then, splitting the input data into data components involves splitting 24 each block B of data into data components, and the exclusive-or operation and the multiplying, at 26, are performed for each block B using a different one of the initialized hashes. It is contemplated that each data block B is processed serially for a serial stream of input data, however, additional parallelism can be used to parallel process blocks B.

Figure 2:
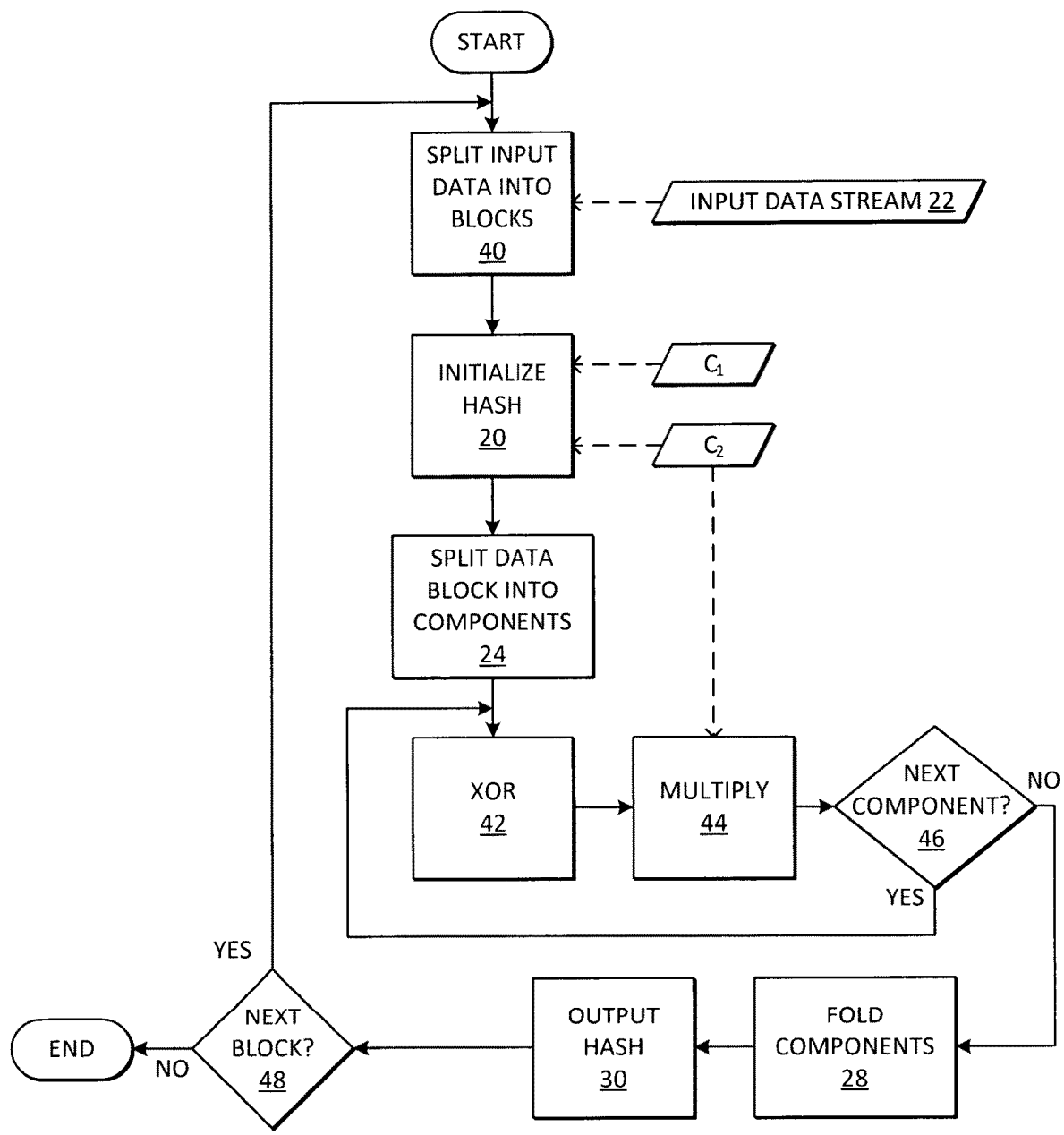
FIG. 2 is a flowchart of a method of computing the hash.

FIG. 2 is a flowchart describing a method of computing a hash. Like reference numerals indicate like elements, and reference can be made to the above description for further detail. For sake of explanation, the method of FIG. 2 will be described in terms of the processor 10 of FIG. 1, but it should be understood that the method is not limited by specific processors or hardware.

An input stream 22 of data is split 40 into blocks. This can be performed as a continuous or near continuous stream of data arrives. Alternatively, if the data is more static in nature, splitting 40 can be performed for substantially all the data in one operation or as needed. Should a block not be filled completely with data, it can be padded with dummy data, such as a string of zeroes.

For a particular block of data, a hash made up of hash components is initialized at 20. Constants $C_1$ and $C_2$ can be used and can be selected to have FNV parameter values, such as offset_basis and FNV_prime, respectively.

The block of input data is split 24 into data components, one for each hash component. Each data component has a length equal to a machine word size M, which is contemplated to be greater than one byte. The components of the block of data and the hash components can be specified to have the same length.

An exclusive-or operation 42 is performed on each data component and the respective hash component, and the result is multiplied 44 by a pre-defined constant $C_2$, such as FNV_prime. The exclusive-or operation and multiplication can be performed in any order, however, it is contemplated that performing the exclusive-or operation first will preserve benefits similar to those that FNV-1a has over FNV-1. The components are iterated through, at 46, until all data components and the respective hash components have been processed. It is advantageous that the exclusive-or operation 42 and multiplication 44 are performed in isolation for each data/hash component, as this can make the method amenable to parallel processing. As such, several of the exclusive-or operations 42 and multiplications 44 may be performed at about the same time, with the check at 46 representing a check of whether all parallel operations have been completed. Hence, steps 42-46 represent parallel performing of a bitwise hashing function, in which each data component is hashed with a respective different one of the hash components.

Results of the hashing function may be folded together, at 28, before being output at 30.

Additional blocks of input data undergo the same process until all data has been hashed, at 48. It is recognized that the method may loop indefinitely, if not halted externally, when applied to a continuous or near continuous stream of input data.

Figure 3:
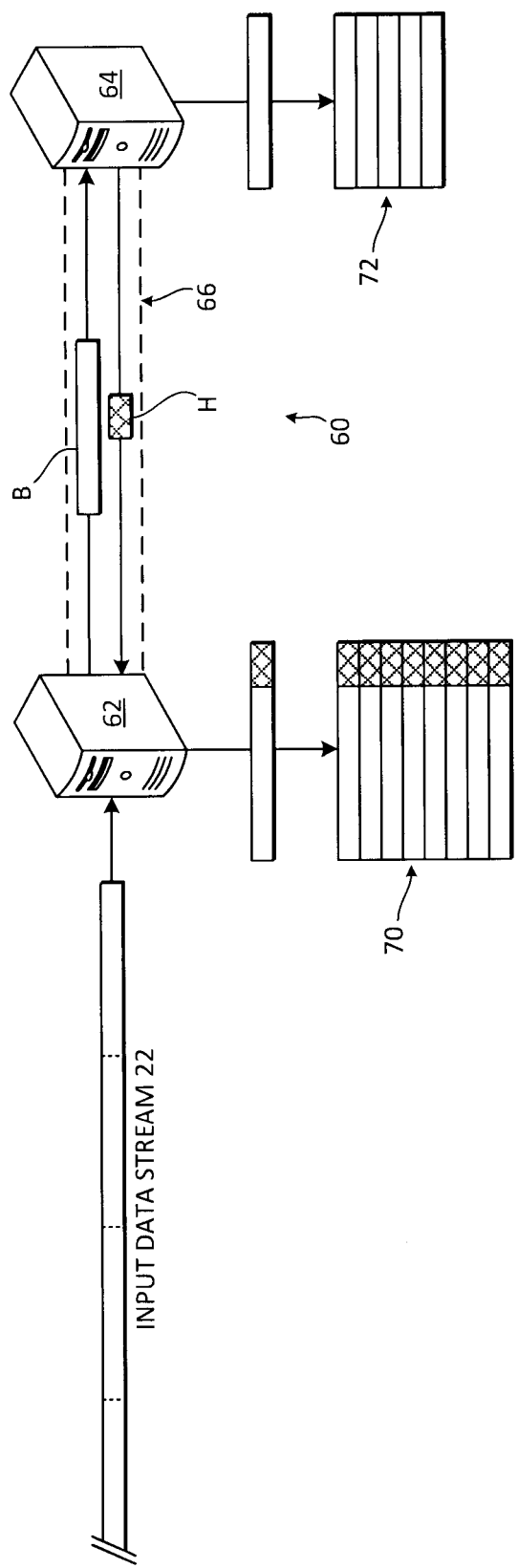
FIG. 3 is a schematic diagram showing use of the hash in a low-latency data replication application.

With reference to FIG. 3, the hash computation techniques described herein may be used as a checksum in a computer system 60 configured for RDMA data replication. Such a computer system 60 may be applied to financial order/transaction failover, in which a primary server 62 replicates instructions and data to a secondary server 64 that becomes active during failure of the primary server 62. The primary and secondary servers 62, 64 may be communicatively connected via a high-speed serial link 66, such as a Peripheral Component Interconnect Express (PCIe) bus.

The primary server 62 can be configured to receive one or more streams of input data 22, containing data and instructions for processing such data, and to split input data into blocks B. The primary server 62 is further configured to perform a hash computation on blocks B, as discussed elsewhere herein, to obtain hashes H. The primary server 62 stores blocks along with the computed hashes in memory 70. The primary server 62 is further configured to replicate blocks B to the secondary server 64 via the link 66. The primary server 62 may also be configured to execute instructions on data contained in the blocks B, such as resting orders, matching orders, executing trades, among other financial data operations.

The secondary server 64 is configured to receive blocks B and store such in memory 72. The secondary server 64 is further configured to compute hashes H for blocks B, as discussed elsewhere herein, and to respond to each block B sent by the primary server 62 with a respective hash H as a transmission checksum. Thus, by comparing stored hashes H to received hashes H, the primary server 62 can check whether blocks B were properly transmitted to the secondary server 64, and trigger retransmission any block B that fails the checksum.

The primary server 62 may either delete or maintain the stored hashes H after successful confirmation of transmission has been determined. The secondary server 64 may store computed hashes H in memory 72. Further, the primary server 62 and secondary server 64 may be made functionally identical, so that during failover all instruction execution, replication operations, and checksum operations persist.

Because the hashing techniques described herein can be calculated at high speed, the effect on the system 60 is an overall reduction in potential latency by way of a reduced chance that checksum operations will result in a bottleneck and by a reduced processing load in calculating checksums. Further, high collision avoidance is maintained, which helps ensure data integrity during replication for failover purposes.

Figure 4:
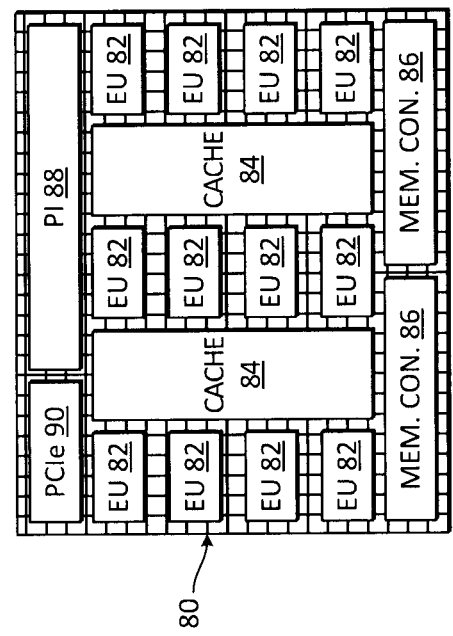
FIG. 4 is a schematic diagram of another processor for computing the hash.

FIG. 4 shows a diagram of another processor 80 suitable for the hashing computations discussed herein. The processor 80 may be particularly suitable for use in the servers 62, 64 of the system 60 (FIG. 3). The processor 80 includes 12 execution units 82 and may be referred to as a 12-core processor. The processor 80 can further include shared cache 84, such as level 3 cache, as well as memory controllers 86 and point-to-point processor interconnect (PI) 88. Further, the processor 80 may also include a PCIe bus 90 for communication with peripherals and communication, such as RDMA, between processors 80 of different servers 62, 64. The processor 80 may be of the type sold by Intel Corporation under the name Xeon.

It is contemplated that the hash computations discussed herein can be implemented via a process or thread which may be pinned (locked) to an execution unit (core) of a suitable processor 10, 80, provided that the processor and operating system support such feature. For example, a process or thread that performs hash computations can be pinned to a selected number of execution units, and this number can be taken as the value of N discussed above.

FIG. 5 shows results of a performance test of the hash computation discussed above. The implementation tested used a 256-bit block size with a machine word size of 64 bits. The tests were conducted on a 3 GHz Intel Xeon processor and the process was pinned to execute on a single core. Tests were performed on large buffers and small buffers. The large buffer occupied 256 kibibytes and the small buffer occupied 16 bytes. The SMHasher test suite (See http://code.google.com/p/smhasher/) was used to compare the hash computation with existing methods. As shown at 100, the 256-bit implementation of the present hash computation is the fastest of the techniques tested on both aligned and unaligned large buffers, and comparably fast on the small buffer.

In view of the above, it should be apparent that the present hashing techniques allow for fast hash calculation with high collision avoidance. The known manner of byte-wise iteration can be dropped in favor of the disclose techniques that advantageously exploit parallel processing capabilities of modern processors by aligning hash computations to machine word size. Parallel operating execution units can be used to process components of a hash independently. Such hash computations can provide a checksum suitable to meet the demands of low-latency RDMA replication of data.

While the foregoing provides certain non-limiting example embodiments, it should be understood that combinations, subsets, and variations of the foregoing are contemplated. The monopoly sought is defined by the claims.

What is claimed is:

1. A method of computing a hash, the method comprising:
   initializing the hash to an initial value;
   receiving input data;
   splitting the input data into data components;
   performing, in parallel, an exclusive-or operation on each data component and a respective hash component of the hash, and multiplying, in parallel, each respective hash component by a pre-defined constant; and
   outputting a representation of the hash components as the hash.

2. The method of claim 1 further comprising:
   splitting the input data into blocks; and
   initializing a plurality of hashes, one hash for each block;
   wherein splitting the input data into data components comprises splitting each block into data components, and wherein the exclusive-or operation and the multiplying are performed for each block using a different one of the hashes.

3. The method of claim 2, wherein the splitting comprises providing each of the data components with a length equal to a machine word size of an execution unit of a processor.

4. The method of claim 3, comprising using a plurality of parallel execution units of a processor to perform the exclusive-or operation and the multiplying.

5. The method of claim 4, wherein each data component is longer than one byte, each hash component is longer than one byte, and the exclusive-or operation and the multiplying are performed in a non-bytewise manner.

6. The method of claim 5, further comprising folding together the hash components to obtain the hash.

7. A method of computing a hash, the method comprising:
   splitting input data into data components, each data component having a length equal to a machine word size of an execution unit of a processor, wherein the machine word size is greater than one byte;
   providing hash components of length equal to the length of each data component;
   parallel performing a bitwise hashing function, in which each data component is hashed with a respective different one of the hash components; and
   outputting a representation of the hash components as the hash.

8. The method of claim 7 comprising performing the splitting, providing, parallel performing, and outputting for each block of an input data stream.

9. The method of claim 8, further comprising folding together the hash components to obtain the hash.

10. The method of claim 9, wherein the bitwise hashing function comprises an exclusive-or operation and a multiplication.

11. A computer comprising:
    memory configured to store input data;
    a processor having a plurality of parallel execution units, each execution unit having a machine word size;
    the processor configured to:
      split the input data into data components, each data component having a length equal to the machine word size;
      provide hash components of length equal to the length of each data component;
      perform a bitwise hashing function, in which each data component is simultaneously hashed with a respective different one of the hash components; and
      output a representation of the hash components as the hash.

12. The computer of claim 11, wherein the processor is configured to split, provide, perform, and output for each block of an input data stream.

13. The computer of claim 12, wherein the processor is further configured to fold together the hash components to obtain the hash.

14. The computer of claim 13, wherein the bitwise hashing function comprises an exclusive-or operation and a multiplication.

* * * * *